United States Patent

[11] 3,557,754

| [72] | Inventor | Harold Bader<br>Fairfield, N.J. |
|---|---|---|
| [21] | Appl. No. | 792,955 |
| [22] | Filed | Jan. 22, 1969 |
| [45] | Patented | Jan. 26, 1971 |
| [73] | Assignee | Miracle Pet Products, Inc.<br>Jersey City, N.J.<br>a corporation of New Jersey |

[54] AQUARIUM BOTTOM AND METHOD OF PREPARATION
7 Claims, 2 Drawing Figs.

| [52] | U.S. Cl. | 119/5 |
|---|---|---|
| [51] | Int. Cl. | A01k 64/00 |
| [50] | Field of Search | 119/5;<br>35/66 |

[56] References Cited
UNITED STATES PATENTS

| 308,296 | 11/1884 | Whittemore | 35/66 |
|---|---|---|---|
| 338,397 | 3/1886 | Frey | 35/66 |
| 1,871,742 | 8/1932 | Sabath | 119/5 |
| 2,879,742 | 3/1959 | Morrill | 119/5 |
| 3,167,051 | 1/1965 | Horlid | 119/5 |

Primary Examiner—Hugh R. Chamblee
Attorney—Fulwider, Patton, Rieber, Lee & Utecht ABSTRACT: An aquarium bottom made of glass plate whose upper and lower faces include a multiplicity of surface irregularities, the lower face also being covered by an opaque coating, whereby light rays incident upon the bottom are reflected and refracted so as to provide the optical illusion that the bottom is made of a sheet of slate. The invention further includes the method of providing the surface irregularities and opaque coating.

PATENTED JAN26 1971

3,557,754

INVENTOR.
HAROLD BADER
BY Fulwider, Patton, Rieber,
Lee and Utecht
ATTORNEYS

AQUARIUM BOTTOM AND METHOD OF PREPARATION

BACKGROUND OF THE INVENTION

1. Field of the Invention

The present invention relates to aquariums for aquatic animals or plants.

2. Description of the Prior Art

In a conventional aquarium the sides and bottom are made of glass plates suitably secured together for the containment of water. However, many persons prefer to have the aquarium bottom made of slate.

Slate is relatively heavy and costly and numerous attempts have been made in the prior art to simulate the appearance of slate with less expensive materials. These attempts have been largely unsuccessful.

SUMMARY

According to the present invention, an aquarium bottom is provided on its opposite faces with a multiplicity of surface irregularities to render the transparent material of the bottom translucent, and the lower or outer one of the surfaces is coated with an opaque material. Under the optical conditions present in an aquarium, the bottom then has the appearance of a sheet of slate.

The surface irregularities can be created by a conventional sandblasting operation, and the opaque material can simply be an opaque paint. Consequently, a relatively lightweight and inexpensive glass plate can be prepared quickly and easily to simulate the more expensive slate material.

Other objects and features of the invention will become apparent from consideration of the following description taken in connection with the accompanying drawings.

DESCRIPTION OF THE PREFERRED EMBODIMENT

Figure 1:
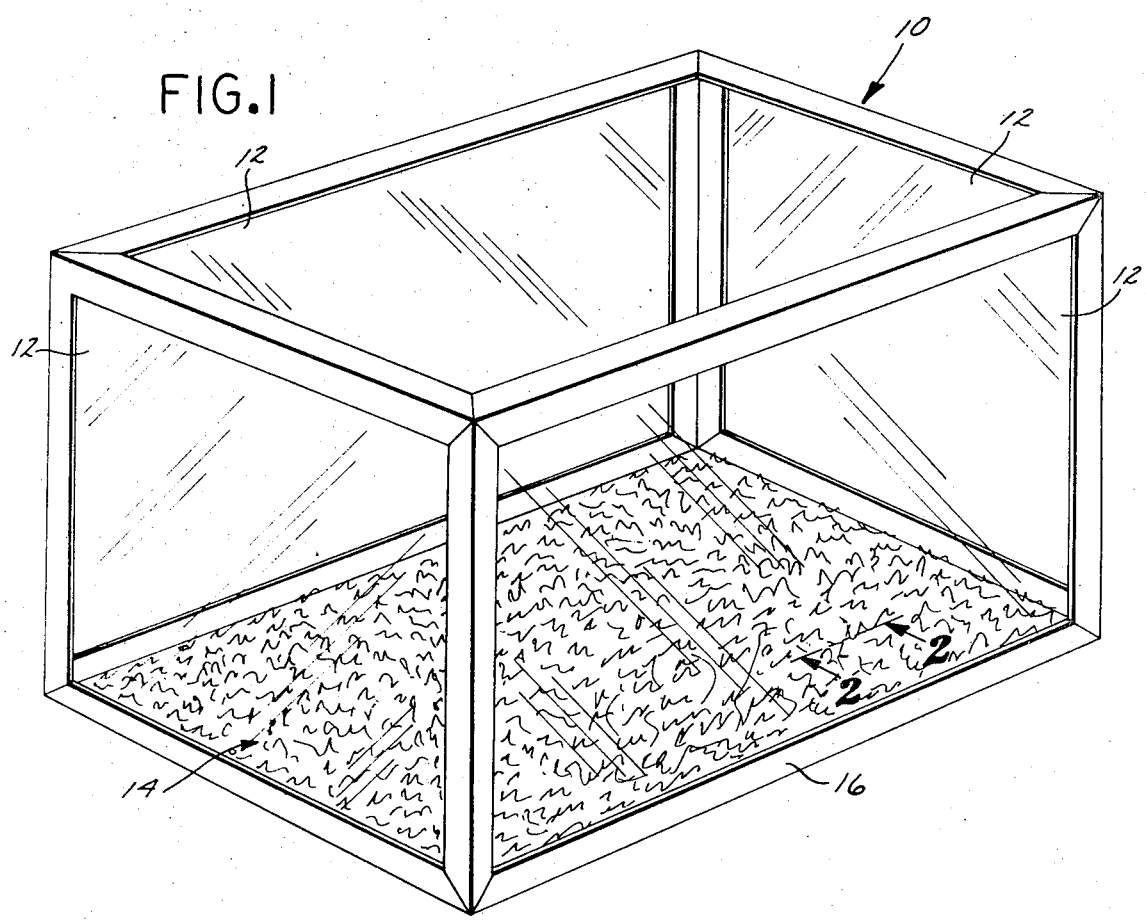
FIG. 1 is a perspective view of an aquarium including a bottom according to the present invention.

Referring now to the drawings, there is illustrated an aquarium 10 having four sides 12 and a bottom 14. The sides 12 are made of plate glass and are secured to one another and to the bottom 14 by any suitable frame 16. In assembled relation, the sides 12 and bottom 14 are adapted for the containment of water, and a cover (not shown) is commonly employed over the aquarium 10 to house lights for illuminating the water-filled aquarium 10.

The bottom 14 is made of a plate 15 of transparent material such as common plate glass having an upper face 18 and a lower face 20.

Each of the faces 18 and 20 is subjected to a conventional sandblasting operation to provide a multiplicity of small cuts, engravings, or surface irregularities 22. THe irregularities 22 are characterized by irregularly oriented facets which, by virtue of their presence throughout the surfaces of the faces 18 and 20, render the otherwise transparent plate 15 translucent.

Figure 2:
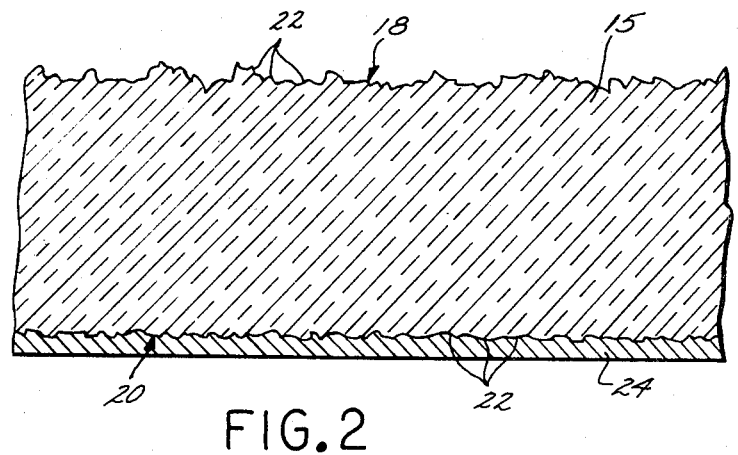
FIG. 2 is an enlarged cross-sectional view of a portion of the aquarium bottom of FIG. 1.

As best seen in FIG. 2, the underside or lower face 20 of the plate 15 is provided with a coating 24 of opaque material. The coating 24 is coextensive with the lower face 20 and is preferably a brush or spray coating of black enamel paint.

With this arrangement, the optical conditions present in the aquarium cause the bottom 14 to simulate the appearance of a tablet or a sheet of slate. Apparently light rays passing through the water in the aquarium and incident upon the bottom 14 are reflected and refracted in just the proper manner necessary to provide the optical illusion that the bottom is made of slate. Although the phenomenon is not completely understood, the results are quite startling, and to a casual observer the plate 15 appears to be made of slate.

Various modifications and changes may be made with regard to the foregoing detailed description without departing from the spirit of the invention.

I claim:

1. In an aquarium having sides and a bottom for the containment of water, an improved aquarium bottom comprising a plate of transparent material having upper and lower faces, each said face being characterized by a multiplicity of surface irregularities coextensive with said face, and further having a coating of opaque material upon and coextensive with said lower face, whereby light rays incident upon said bottom are reflected and refracted such as to provide the optical illusion that said bottom is made of a sheet of slate.

2. An improved aquarium bottom according to claim 1 wherein said plate is made of glass.

3. An improved aquarium bottom according to claim 1 wherein said surface irregularities are constituted of a multiplicity of tiny cuts having irregularly oriented facets which render said plate translucent.

4. An improved aquarium bottom according to claim 1 wherein said coating is a paint.

5. An improved aquarium bottom according to claim 4 wherein said paint is black.

6. A method of preparing the upper and lower faces of an aquarium bottom made of transparent glass plate such that in an aquarium said bottom provides the optical illusion of being made of a sheet of slate, said method comprising the steps of:

sand blasting the opposite faces of said aquarium bottom sufficiently to render said bottom translucent; and coating the lower face of said bottom with an opaque material.

7. A method according to claim 6 wherein said coating comprises applying black paint to said bottom.